(12) United States Patent
Atake

(10) Patent No.: US 10,583,693 B2
(45) Date of Patent: Mar. 10, 2020

(54) PNEUMATIC TIRE

(71) Applicant: SUMITOMO RUBBER INDUSTRIES, LTD., Kobe-shi, Hyogo (JP)

(72) Inventor: Ikuo Atake, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 160 days.

(21) Appl. No.: 15/610,051

(22) Filed: May 31, 2017

(65) Prior Publication Data

US 2017/0341470 A1 Nov. 30, 2017

(30) Foreign Application Priority Data

May 31, 2016 (JP) .................................. 2016-108044

(51) Int. Cl.
| | |
|---|---|
| *B60C 11/00* | (2006.01) |
| *B60C 11/01* | (2006.01) |
| *B60C 13/00* | (2006.01) |
| *B60C 11/03* | (2006.01) |

(52) U.S. Cl.
CPC ........ *B60C 11/005* (2013.01); *B60C 11/0041* (2013.01); *B60C 11/01* (2013.01); *B60C 13/00* (2013.01); *B60C 2011/016* (2013.01); *B60C 2011/039* (2013.01); *B60C 2200/06* (2013.01)

(58) Field of Classification Search
CPC ............. B60C 11/005; B60C 2011/016; B60C 11/0041
See application file for complete search history.

(56) References Cited

U.S. PATENT DOCUMENTS

| | | | |
|---|---|---|---|
| 4,724,878 A | 2/1988 | Kabe et al. | |
| 8,293,833 B2* | 10/2012 | Hochi ................... | B60C 1/0016 |
| | | | 524/492 |
| 2013/0105052 A1* | 5/2013 | Tanaka ................ | B60C 11/0306 |
| | | | 152/209.17 |

(Continued)

FOREIGN PATENT DOCUMENTS

| | | |
|---|---|---|
| EP | 0662396 A1 | 7/1995 |
| JP | 2001-158208 A | 6/2001 |
| JP | 2013-237283 A | 11/2013 |

OTHER PUBLICATIONS

Extended European Search Report dated Oct. 24, 2017 for corresponding European Application No. 17172361.2.

*Primary Examiner* — Alison L Hindenlang
*Assistant Examiner* — George W. Brady
(74) *Attorney, Agent, or Firm* — Birch, Stewart, Kolasch & Birch, LLP

(57) ABSTRACT

A tire 22 includes a plurality of ribs 68 aligned in an axial direction. A rib 68s, among the plurality of ribs 68, disposed on an outer side in the axial direction is sectioned into a body portion 74 and a side portion 76 by a groove 72 that extends in a circumferential direction. The tire 22 includes a tread 26 and a pair of sidewalls 28. The sidewalls 28 extend almost inward from ends, respectively, of the tread 26 in a radial direction. The tread 26 includes a base layer 52, and a cap layer 54 disposed outward of the base layer 52 in the radial direction. The side portion 76 is formed by the cap layer 54 and a corresponding one of the sidewalls 28. The sidewall 28 is stacked on the cap layer 54 in the side portion 76.

9 Claims, 3 Drawing Sheets

(56) References Cited

U.S. PATENT DOCUMENTS

| | | | |
|---|---|---|---|
| 2013/0220500 A1* | 8/2013 | Okabe | B60C 11/0306 |
| | | | 152/209.18 |
| 2014/0069561 A1* | 3/2014 | Dermience | B60C 11/1353 |
| | | | 152/209.18 |
| 2016/0059633 A1* | 3/2016 | Zhao | B60C 11/0058 |
| | | | 152/209.5 |
| 2016/0059636 A1 | 3/2016 | Zhao et al. | |
| 2017/0008345 A1* | 1/2017 | Gayton | B60C 11/005 |
| 2017/0050469 A1* | 2/2017 | Hashimoto | B60C 11/00 |
| 2017/0129286 A1* | 5/2017 | Kawakami | B60C 11/0008 |

* cited by examiner

PNEUMATIC TIRE

This application claims priority on Patent Application No. 2016-108044 filed in JAPAN on May 31, 2016. The entire contents of this Japanese Patent Application are hereby incorporated by reference.

BACKGROUND OF THE INVENTION

Field of the Invention

The present invention relates to pneumatic tires. More specifically, the present invention relates to pneumatic tires having narrow grooves formed in shoulders.

Description of the Related Art

FIG. 3 shows a shoulder rib 4 portion (also referred to as a shoulder portion) of a conventional tire 2. As shown in FIG. 3, the tire 2 includes a tread 6 and sidewalls 8. The sidewalls 8 extend almost inward from the tread 6 in the radial direction. In the tire 2, the sidewalls 8 are layered on the tread 6. Such a structure is also referred to as an SOT (Sidewall on Tread) structure. In the SOT structure, an end PK of each sidewall 8 is positioned on a side surface 12 that extends almost inward from an end PE of a tread surface 10 in the radial direction. A distance, (indicated by a double-headed arrow HS in FIG. 3), in the radial direction, from the end PE of the tread surface 10 to the end PK of the sidewall 8 is typically set as appropriate so as to be in a range from 3 mm to 40 mm.

The tread 6 includes a base layer 14 and a cap layer 16. The cap layer 16 is disposed outward of the base layer 14 in the radial direction, and covers the entirety of the base layer 14. For the cap layer 16, a crosslinked rubber that is excellent in wear resistance, heat resistance, and grip performance is used. The end PK of the sidewall 8 described above is also an end of a boundary 18 between the cap layer 16 and the sidewall 8. For the base layer 14, a crosslinked rubber excellent in adhesiveness is used. From the viewpoint of reduction of rolling resistance, low heat generation properties may also be considered for a crosslinked rubber for the base layer 14.

The tire 2 treads on a road surface at the tread 6. Thus, a ground-contact surface is formed between the tire 2 and the road surface. The end of the ground-contact surface is disposed in the shoulder portion of the tire 2, and a contact pressure at the shoulder portion tends to be higher than that in another portion. Therefore, a problem arises that wear is likely to develop in the shoulder portions. In particular, such wear, in other words, uneven wear is found in various portions in the tire 2 which is a heavy duty tire mounted to a truck, a bus, or the like in which heavy load acts on the tire 2.

As shown in FIG. 3, the shoulder rib 4 may auxiliarly have a narrow groove 20 formed therein. It is known that such a technique in which the groove 20 is formed in the shoulder rib 4 is effective for reducing uneven wear. Meanwhile, it is also known that damage is likely to occur at the bottom of the groove 20, and the groove 20 may not effectively function to reduce the uneven wear depending on the degree of the damage. In order to improve durability and allow the groove 20 to effectively function, various studies are performed. Examples of the studies are disclosed in JP2013-237283 and JP2001-158208.

In JP2013-237283, a technique in which a reinforcing layer including a reinforcing cord is provided along the above-described groove 20 to improve durability, is disclosed. In order to apply this technique, the reinforcing layer needs to be newly added as a component of the tire 2. In this technique, although durability can be improved, productivity is likely to be reduced.

In JP2001-158208, a technique in which the above-described groove 20 is formed so as to have a special cross-sectional shape (specifically, round-bottom-flask shape) to improve durability, is disclosed. In order to apply this technique, a mold for producing the tire 2 needs to be newly formed. Since the groove 20 has the special shape, cost may be increased not only for production of the mold but also for maintenance and management or the like. Also in this technique, although durability can be improved, productivity may be reduced.

The inventors investigate the cause of damage to the groove 20, and study the groove 20 portion in detail in order to develop a technique in which durability can be improved without reducing productivity. As a result, as shown in FIG. 3, it is found that a portion (a portion indicated by an arrow PP in FIG. 3) of the base layer 14 is formed so as to protrude and the thickness of a portion of the cap layer 16 at the bottom of the groove 20 is not sufficient. The present invention is made on the basis of the findings.

An object of the present invention is to provide a pneumatic tire that has an improved durability without reducing productivity.

SUMMARY OF THE INVENTION

A pneumatic tire according to the present invention includes a plurality of ribs aligned in an axial direction. A rib, among the plurality of ribs, disposed on an outer side in the axial direction is sectioned into a body portion and a side portion by a groove that extends in a circumferential direction. The tire includes a tread and a pair of sidewalls. The sidewalls extend almost inward from ends, respectively, of the tread in a radial direction. The tread includes a base layer, and a cap layer disposed outward of the base layer in the radial direction. The side portion is formed by the cap layer and a corresponding one of the sidewalls. The sidewall is stacked on the cap layer in the side portion.

In the pneumatic tire according to the present invention, the sidewall stacked on the cap layer prevents the base layer from having a protrusion. In the tire, the thickness of the cap layer is appropriately assured in the groove portion that sections the rib disposed on the outer side in the axial direction, that is, a shoulder rib into the body portion and the side portion. In the tire, damage is less likely to occur at the groove bottom portion. In the tire, the groove is maintained, whereby an effect of reducing uneven wear by providing the groove is exhibited as expected. In addition, a new component need not be added and the groove need not be formed into a special shape in order to prevent the groove from being damaged. The tire has an improved durability without reducing productivity. According to the present invention, the pneumatic tire having an improved durability without reducing productivity can be obtained.

In the pneumatic tire, a ratio of a width of the side portion to a height of the side portion is preferably less than or equal to 0.5. Further, the ratio of the width of the side portion to the height of the side portion is preferably not less than 0.2.

In the pneumatic tire, the side portion preferably has a top surface on an outer side in the radial direction. In the side portion, an end of a boundary between the sidewall and the cap layer is preferably disposed inward of an outer end of the top surface in the axial direction.

In the pneumatic tire, the end of the boundary between the sidewall and the cap layer is preferably disposed outward of a position corresponding to half the height of the side portion in the radial direction.

DESCRIPTION OF THE PREFERRED EMBODIMENTS

The following will describe in detail the present invention based on preferred embodiments with reference where appropriate to the accompanying drawing.

Figure 1:
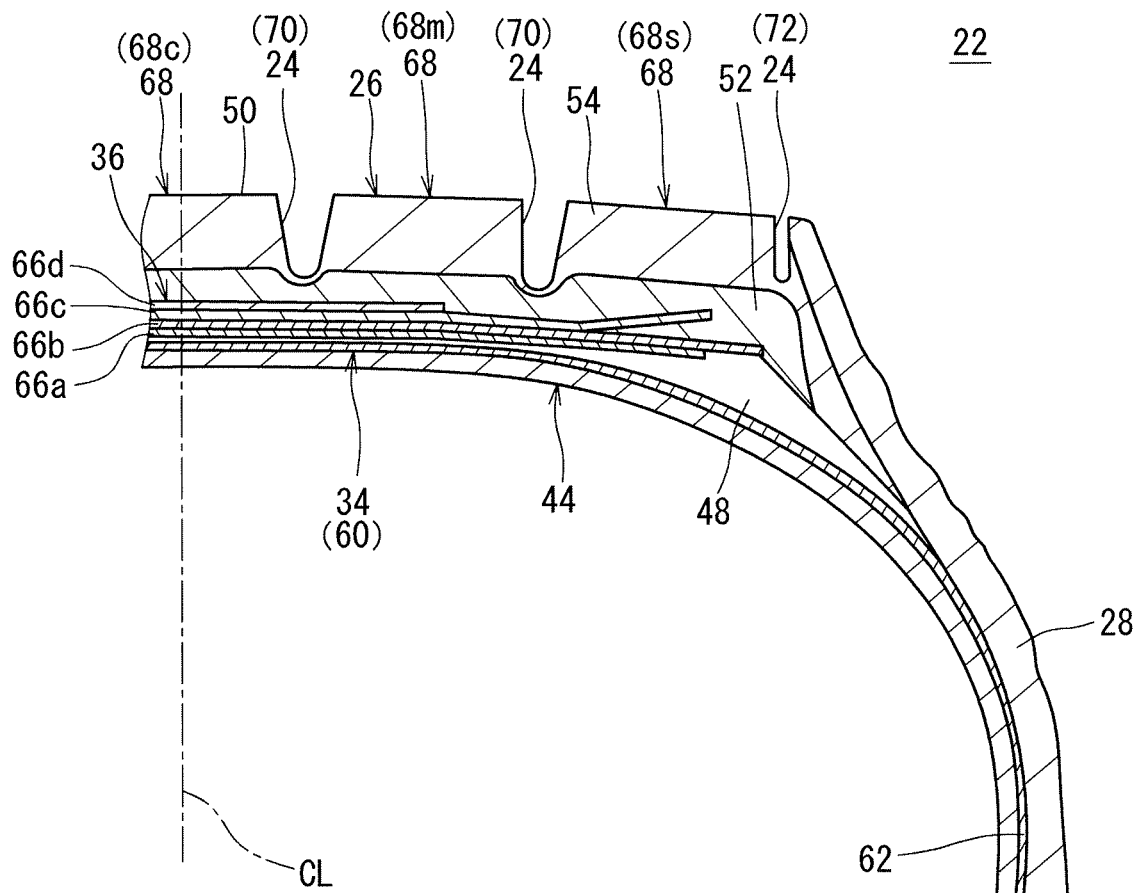
FIG. 1 is a cross-sectional view of a part of a pneumatic tire according to an embodiment of the present invention.

FIG. 1 shows a pneumatic tire 22. In FIG. 1, the up-down direction represents the radial direction of the tire 22, the left-right direction represents the axial direction of the tire 22, and a direction perpendicular to the surface of the drawing sheet represents the circumferential direction of the tire 22. In FIG. 1, an alternate long and short dash line CL represents the equator plane of the tire 22. The tire 22 has grooves 24 formed therein as described below. A tread pattern is formed by the grooves 24. The tire 22 has a shape that is symmetric about the equator plane except for the tread pattern.

The tire 22 is mounted on a rim, which is not shown. The inside of the tire 22 is inflated with, for example, air as gas, and the internal pressure of the tire 22 is adjusted.

In the present invention, the dimensions and angles of the components of the tire 22 are measured in a state where the tire 22 is mounted on a normal rim, and the tire 22 is inflated with air to a normal internal pressure. During the measurement, no load is applied to the tire 22. When the tire 22 is for a passenger car, the dimensions and the angles are measured in a state where the internal pressure is 180 kPa.

In the description herein, the normal rim represents a rim that is specified according to the standard with which the tire 22 complies. The "standard rim" in the JATMA standard, the "Design Rim" in the TRA standard, and the "Measuring Rim" in the ETRTO standard are included in the normal rim.

In the description herein, the normal internal pressure represents an internal pressure that is specified according to the standard with which the tire 22 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

In the description herein, the normal load represents a load that is specified according to the standard with which the tire 22 complies. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard, are included in the normal load.

The tire 22 includes a tread 26, a pair of sidewalls 28, a pair of clinches 30, a pair of beads 32, a carcass 34, a belt 36, a pair of strips 38, a pair of mid layers 40, a pair of fillers 42, an inner liner 44, a pair of chafers 46, and a pair of cushion layers 48. The tire 22 is of a tubeless type. The tire 22 is mounted to a truck, a bus, or the like. The tire 22 is a heavy duty tire.

The tread 26 has a shape that projects outward in the radial direction. The tread 26 forms a tread surface 50 that comes into contact with a road surface. The tread 26 has a base layer 52 and a cap layer 54. The cap layer 54 is disposed outward of the base layer 52 in the radial direction. The cap layer 54 is layered on the base layer 52. The base layer 52 is covered with the cap layer 54. The base layer 52 is formed from a crosslinked rubber excellent in adhesiveness. A base rubber of the base layer 52 is typically natural rubber. For the base layer 52, low heat generation properties are considered. The base layer 52 contributes to reduction of rolling resistance. The cap layer 54 is formed from a crosslinked rubber that is excellent in wear resistance, heat resistance, and grip performance.

The sidewalls 28 extend almost inward from the ends, respectively, of the tread 26 in the radial direction. The radially outer side portions of the sidewalls 28 are jointed to the tread 26. The radially inner side portions of the sidewalls 28 are jointed to the clinches 30. The sidewalls 28 are formed from a crosslinked rubber that is excellent in cut resistance and weather resistance. The sidewalls 28 prevent damage to the carcass 34.

In the tire 22, the sidewalls 28 are layered on the tread 26. The tire 22 has an SOT (Sidewall on Tread) structure.

The clinches 30 are disposed almost inward of the sidewalls 28, respectively, in the radial direction. The clinches 30 are disposed outward of the beads 32 and the carcass 34 in the axial direction. The clinches 30 are formed from a crosslinked rubber excellent in wear resistance. The clinch 30 comes into contact with a flange of a rim, which is not shown.

The beads 32 are disposed inward of the clinches 30, respectively, in the axial direction. Each bead 32 includes a core 56 and an apex 58 that extends outward from the core 56 in the radial direction. The core 56 is ring-shaped, and includes a wound non-stretchable wire. A material of the wire is typically steel. The apex 58 is tapered outward in the radial direction. The apex 58 is formed from a highly hard crosslinked rubber.

The carcass 34 includes a carcass ply 60. The carcass 34 of the tire 22 is formed from one carcass ply 60. The carcass 34 may be formed from two or more carcass plies 60.

The carcass ply 60 is extended on and between the beads 32 on both sides, along the tread 26 and the sidewalls 28. The carcass ply 60 is turned up around the cores 56 from the inner side toward the outer side in the axial direction. By the carcass ply 60 being turned up, the carcass ply 60 has a main portion 62 and a pair of turned-up portions 64 formed therein. The carcass ply 60 includes the main portion 62 and the pair of turned-up portions 64.

The carcass ply 60 includes multiple cords aligned with each other, and a topping rubber, which is not shown. An absolute value of an angle of each cord relative to the equator plane is typically from 70° to 90°. In other words, the carcass 34 forms a radial structure. The cords are formed from steel. For the cords, cords formed from an organic fiber may be used. In this case, preferable examples of the organic fiber include polyester fibers, nylon fibers, rayon fibers, polyethylene naphthalate fibers, and aramid fibers.

The belt 36 is disposed inward of the tread 26 in the radial direction. The belt 36 is layered on the carcass 34. The belt 36 reinforces the carcass 34. In this viewpoint, the width, in the axial direction, of the belt 36 is preferably greater than or equal to 0.7 times the maximal width of the tire 22.

In the tire 22, the belt 36 includes a first layer 66a, a second layer 66b, a third layer 66c, and a fourth layer 66d. The belt 36 has four layers. The belt 36 may be formed from two layers or three layers.

Each of the first layer 66a, the second layer 66b, the third layer 66c, and the fourth layer 66d includes multiple cords aligned with each other, and a topping rubber, which is not shown. Each cord is tilted relative to the equator plane. An absolute value of the tilt angle is typically greater than or equal to 10° and not greater than 70°. A material of the cords is preferably steel. For the cords, an organic fiber may be used. In this case, preferable examples of the organic fiber include polyester fibers, nylon fibers, rayon fibers, polyethylene naphthalate fibers, and aramid fibers.

Each strip 38 is disposed between the mid layer 40 and the apex 58 in the axial direction. The strip 38 extends along the apex 58 in the radial direction. The strips 38 are formed from a soft crosslinked rubber. As is apparent from FIG. 1, the ends of the turned-up portions 64 contact with the strips 38. The strips 38 reduce concentration of deformation on the ends of the turned-up portions 64. The strips 38 contribute to durability of the tire 22. The strip 38 is a component that is used as appropriate according to the specifications of the tire 22. Depending on the specifications of the tire 22, the strip 38 may not be provided.

Each mid layer 40 is disposed outward of the apex 58 in the axial direction. The mid layer 40 is disposed between the strip 38 and the clinch 30 in the axial direction. The mid layer 40 covers the end of the turned-up portion 64. The mid layer 40 also covers the end of the filler 42. The mid layers 40 have the same degree of flexibility as the strips 38. The mid layers 40 are formed from a soft crosslinked rubber. The mid layers 40 reduce concentration of deformation on these ends. The mid layers 40 contribute to durability of the tire 22. The mid layer 40 is a component that is used as appropriate according to the specifications of the tire 22. Depending on the specifications of the tire 22, the mid layer 40 may not be provided.

The fillers 42 are disposed near the beads 32, respectively. As shown in FIG. 1, each filler 42 is layered over the carcass ply 60, and is turned up around the core 56 from the inner side toward the outer side in the axial direction. The filler 42 includes multiple cords aligned with each other, and a topping rubber, which is not shown. Each cord is formed from steel. The filler 42 is also referred to as a steel filler. The fillers 42 contribute to durability of the tire 22. The filler 42 is a component that is used as appropriate according to the specifications of the tire 22. Depending on the specifications of the tire 22, the filler 42 may not be provided.

The inner liner 44 is disposed inward of the carcass 34. The inner liner 44 is joined to the inner surface of the carcass 34. The inner liner 44 is formed from a crosslinked rubber excellent in airtightness. A base rubber of the inner liner 44 is typically isobutylene-isoprene-rubber or halogenated isobutylene-isoprene-rubber. The inner liner 44 maintains the internal pressure of the tire 22.

The chafers 46 are disposed near the beads 32, respectively. When the tire 22 is mounted on a rim, the chafer 46 comes into contact with the rim. By the contact, portions near the beads 32 are protected. In the present embodiment, the chafers 46 are integrated with the clinches 30. Therefore, the material of the chafers 46 is the same as the material of the clinches 30. The chafers 46 may be formed from a fabric and rubber impregnated into the fabric.

Each cushion layer 48 is layered on the carcass 34 near the end of the belt 36. The cushion layers 48 are formed from a soft crosslinked rubber. The cushion layers 48 absorb stress to the ends of the belt 36. Lifting of the belt 36 is inhibited by the cushion layers 48.

As shown in FIG. 1, the tire 22 has a plurality of ribs 68 in the tread 26 portion. The ribs 68 are aligned in the axial direction. Each rib 68 extends in the circumferential direction. In the tire 22, the rib 68 is formed continuously in the circumferential direction. The rib 68 may be formed from multiple blocks disposed at a predetermined pitch in the circumferential direction. The groove 24 is formed between the rib 68 and the rib 68. In the present invention, a groove 70 that sections the rib 68 from the rib 68 is referred to as a main groove. The main groove 70 extends continuously in the circumferential direction.

From the viewpoint of drainage performance and stiffness of the tread 26 being assured, in the tire 22, the width of the main groove 70 is preferably set to be greater than or equal to 1% of the ground-contact width and not greater than 7% thereof. From the viewpoint of drainage performance and stiffness of the tread 26 being assured, the depth of the main groove 70 is preferably greater than or equal to 10.0 mm and more preferably greater than or equal to 12.0 mm. The depth of the main groove 70 is preferably not greater than 22.0 mm and more preferably not greater than 20.0 mm.

In the present invention, the ground-contact width is represented as the maximal width, in the axial direction, of the ground-contact surface. The ground-contact surface for obtaining the ground-contact width is obtained when, in a state where the tire 22 is mounted on a normal rim, and inflated with air to a normal internal pressure, a normal load is applied to the tire 22, the camber angle is set to 0°, and the tire 22 is caused to come into contact with a flat surface.

The tire 22 has four main grooves 70, in total, which also include not-illustrated main grooves 70. By the four main grooves 70, five ribs 68 are formed in the tread 26 portion of the tire 22. Among the ribs 68, a rib 68c disposed at the center in the axial direction is referred to as a center rib. Ribs 68m disposed on both sides of the center rib 68c are each referred to as a middle rib. Ribs 68s disposed outward of the right and left middle ribs 68m, respectively, are each referred to as a shoulder rib. The shoulder ribs 68s are the ribs 68 disposed on the outermost sides in the axial direction, among the plurality of ribs 68 aligned in the axial direction.

Figure 2:
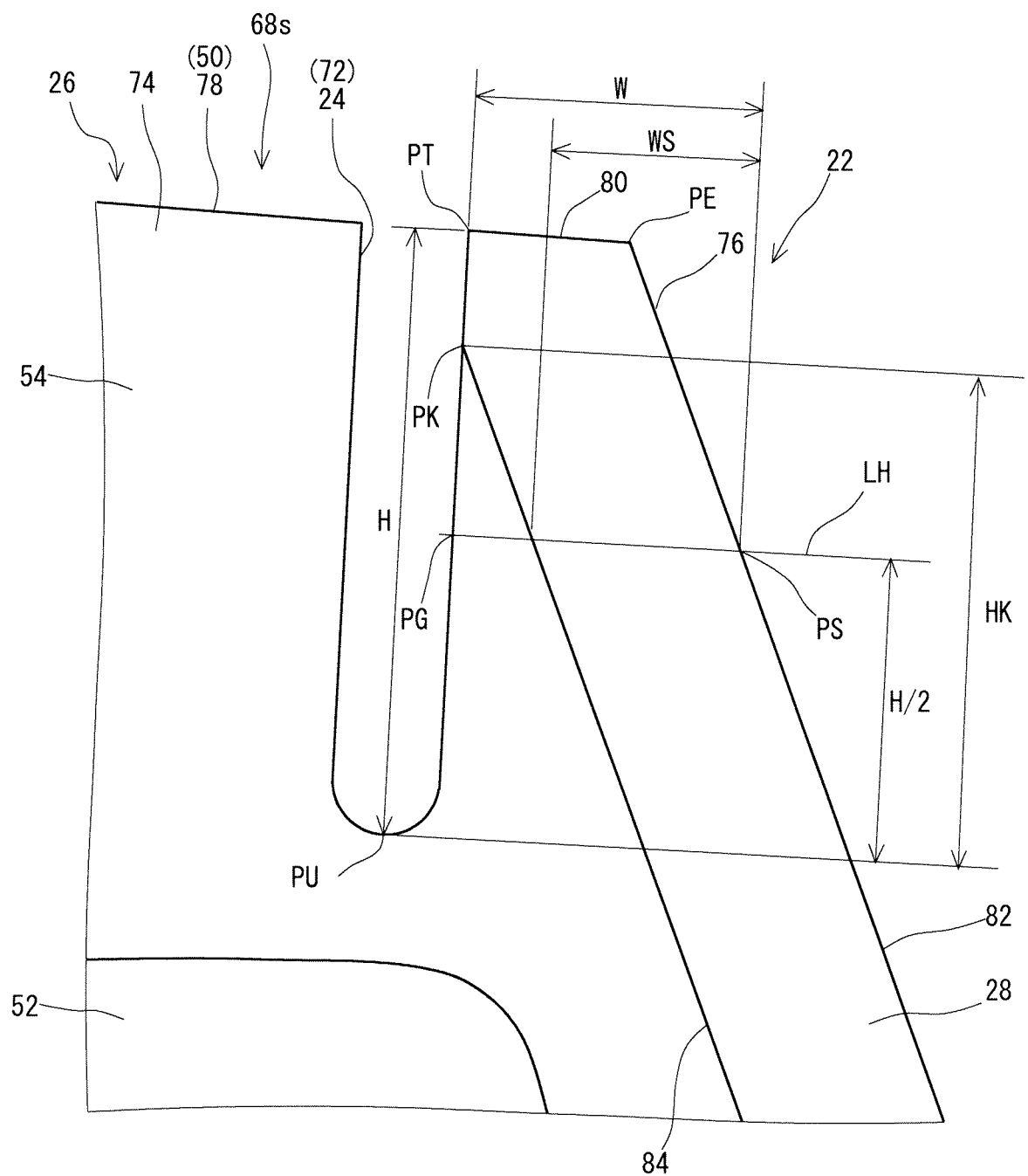
FIG. 2 is an enlarged cross-sectional view of a part of the tire shown in FIG. 1.

FIG. 2 shows the shoulder rib 68s portion of the tire 22. In FIG. 2, the up-down direction represents the radial direction of the tire 22, the left-right direction represents the axial direction of the tire 22, and the direction perpendicular to the surface of the drawing sheet represents the circumferential direction of the tire 22.

In the tire 22, each shoulder rib 68s has the groove 24 formed therein. In the present invention, the groove 24 of the shoulder rib 68s is referred to as a sub-groove 72. The sub-groove 72 extends continuously in the circumferential direction.

In the tire 22, the shoulder rib 68s has the sub-groove 72 formed therein. By the sub-groove 72, the shoulder rib 68s is sectioned into a body portion 74 and a side portion 76. The shoulder rib 68s includes the body portion 74 and the side portion 76 that are sectioned by the sub-groove 72.

In the tire 22, the sub-groove 72 of the shoulder rib 68s is narrower than the above-described main groove 70. The width of the sub-groove 72 is about 1/20 to about 1/3 of the width of the main groove 70. The sub-groove 72 is shallower than the main groove 70. The depth of the sub-groove 72 is about 1/3 to about 4/5 of the depth of the main groove 70.

In the tire 22, the main groove 70 mainly contributes to drainage performance. Meanwhile, the sub-groove 72 inhibits contact pressure in the shoulder rib 68s from increasing, and contributes to prevention of occurrence of uneven wear.

When the tire 22 is produced, a plurality of rubber components such as the tread 26 and the sidewalls 28 are assembled to obtain a raw cover (unvulcanized tire 22). The raw cover is put into a mold, which is not shown. The outer surface of the raw cover contacts with the cavity surface of the mold. The inner surface of the raw cover contacts with a bladder or a core. The raw cover is pressurized and heated in the mold. By the raw cover being pressurized and heated, the rubber composition of the raw cover flows. By the heating, crosslinking reaction occurs in the rubber, to obtain the tire 22. A mold having an uneven pattern in the cavity surface is used, thereby forming an uneven pattern in the tire 22. The cavity surface for the tire 22 has recesses corresponding to the body portion 74 and the side portion 76 of the shoulder rib 68s, which are not shown. A protrusion corresponding to the sub-groove 72 is formed between the recess corresponding to the body portion 74 and the recess corresponding to the side portion 76. When the outer surface of the raw cover contacts with the cavity surface, the protrusion is pressed into the raw cover, to shape the body portion 74 and the side portion 76.

In the tire 22, the radially outer side portion of the body portion 74 is formed by the cap layer 54. Therefore, an outer surface 78 of the body portion 74 is formed by the cap layer 54. When the tire 22 is in a running state, the outer surface 78 of the body portion 74 contacts with a road surface. In other words, the outer surface 78 of the body portion 74 is a part of the tread surface 50. From the viewpoint of wear resistance, heat resistance, and grip performance, the radially outer side portion of the body portion 74 is preferably formed by the cap layer 54 as in the tire 22.

In the tire 22, the side portion 76 itself is worn earlier than the body portion 74, whereby the side portion 76 contributes to reduction of uneven wear in the body portion 74. The side portion 76 is also referred to as a sacrifice rib.

As shown in FIG. 2, in the tire 22, the side portion 76 is formed by the cap layer 54 and the sidewall 28. In the side portion 76, the sidewall 28 is stacked on the cap layer 54. In other words, the sidewall 28 is disposed closer to the outer surface of the tire 22 than the cap layer 54 is. Therefore, when the raw cover contacts with the cavity surface, and the protrusion corresponding to the sub-groove 72 is pressed into the raw cover, the sidewall 28 is firstly put into the recess corresponding to the side portion 76. Subsequently, the cap layer 54 is put into the recess.

Figure 3:
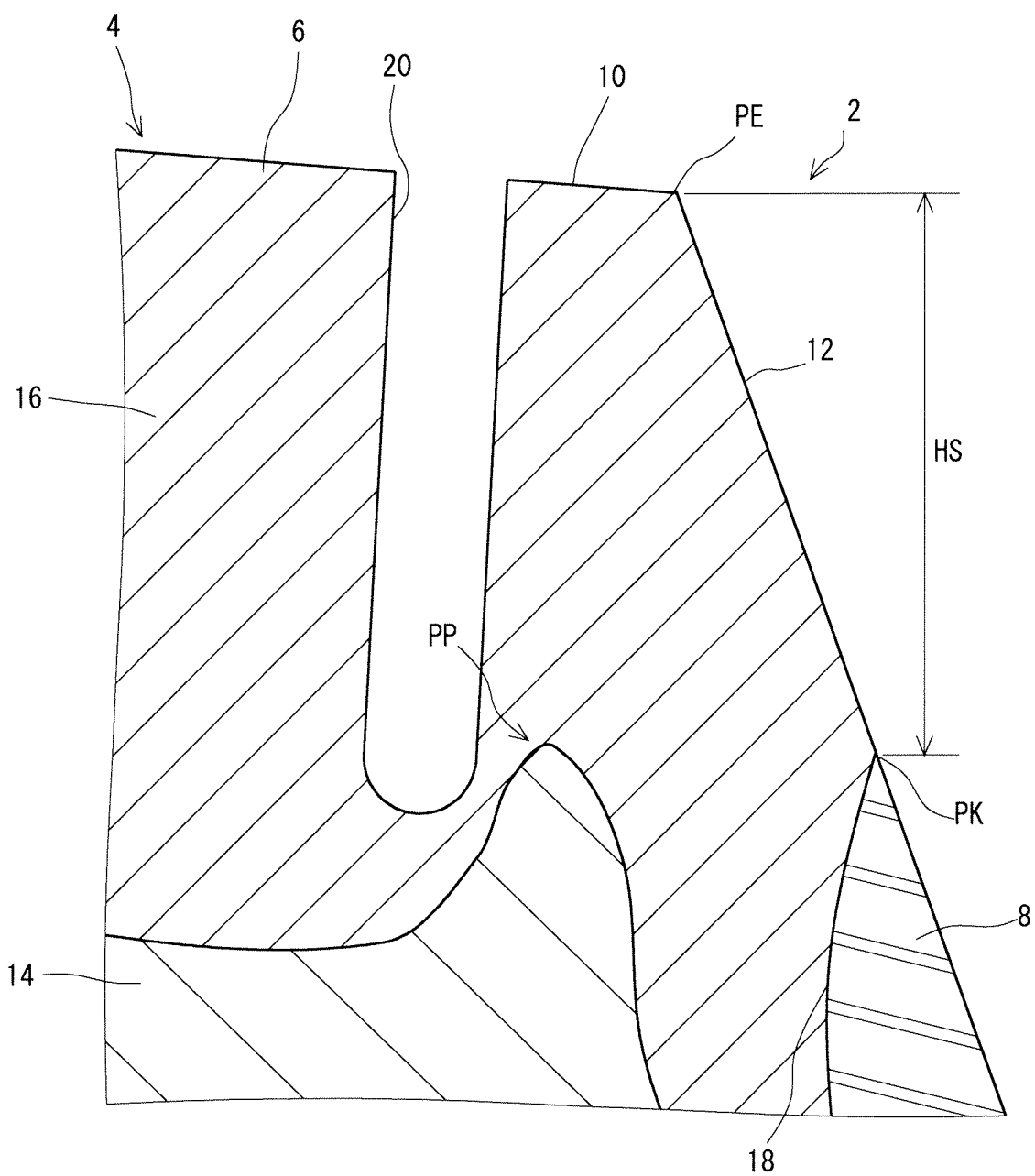
FIG. 3 is an enlarged cross-sectional view of a part of a conventional tire.

In the conventional tire 2 shown in FIG. 3, most of the side portion is formed by the cap layer 16. Therefore, when the raw cover contacts with the cavity surface and the protrusion corresponding to the sub-groove is pressed into the raw cover, the cap layer 16 flows into the recess corresponding to the side portion. In the tire 22, movement of the cap layer 16 that flows into the recess is great, and the movement of the base layer 14 is activated according to the movement of the cap layer 16.

Meanwhile, in the tire 22 of the present invention, as described above, the sidewall 28 is firstly put into the recess. As is apparent from the structure in which the sidewall 28 forms a portion of the side portion 76, the volume of the cap layer 54 that flows into the recess is reduced as compared to that in the conventional tire 2. Therefore, in the tire 22, the movement of the cap layer 54 that flows into the recess is reduced as compared to that in the conventional tire 2. The movement of the base layer 52 according to the movement of the cap layer 54 is also reduced, whereby the base layer 14 is prevented from having, in the tire 22, a protrusion as shown in FIG. 3. In other words, in the tire 22, the sidewall 28 stacked on the cap layer 54 prevents the base layer 52 from having the protrusion. Therefore, in the tire 22, the thickness of the cap layer 54 can be appropriately assured in the sub-groove 72 portion that sections the shoulder rib 68s into the body portion 74 and the side portion 76. Since the thickness of the cap layer 54 is appropriately assured at the bottom of the sub-groove 72, damage is less likely to occur at the bottom of the sub-groove 72. In the tire 22, the sub-groove 72 is maintained, whereby an effect of reducing uneven wear is exhibited by the sub-groove 72 as expected. In addition, a new component need not be added and the sub-groove 72 need not be formed into a special shape in order to prevent the sub-groove 72 from being damaged. The tire 22 has an improved durability without reducing productivity. In the present invention, the pneumatic tire 22 having an improved durability without reducing productivity can be obtained.

In the tire 22, an outer surface 80 of the side portion 76 in the radical direction is referred to as a top surface. In other words, the side portion 76 of the shoulder rib 68s has the top surface 80 on the outer side in the radial direction. In FIG. 2, reference character PT represents the inner end, in the axial direction, of the top surface 80. Reference character PE represents the outer end, in the axial direction, of the top surface 80. In the tire 22, a side surface 82 extends almost inward from the outer end PE in the radial direction.

In FIG. 2, reference character PU represents the deepest portion of the sub-groove 72. The above-described inner end PT is also an edge of the sub-groove 72. A double-headed arrow H represents the depth of the sub-groove 72. The depth H represents the length from the deepest portion PU of the sub-groove 72 to the edge PT thereof. In the present invention, the depth H is also the height of the side portion 76. The depth H is measured along the depth direction of the sub-groove 72, specifically, along the direction in which the center line of the sub-groove 72 extends. A solid line LH represents an imaginary straight line that passes through a position corresponding to half the height H of the side portion 76. Reference character PG represents a specific position on the wall surface of the sub-groove 72 (or the inner surface of the side portion 76). The position PG is a position at which the above-described imaginary straight line LH intersects the wall surface. Reference character PS represents a specific position on the side surface 82 of the tire 22. The position PS is a position at which the above-described imaginary straight line LH intersects the side surface 82. A double-headed arrow W represents the length of the side portion 76 from the position PG to the position PS. In the present invention, the length W represents the width of the side portion 76.

In the tire 22, a ratio of the width W of the side portion 76 to the height H of the side portion 76 is preferably less than or equal to 0.5. When the ratio is set to be less than or equal to 0.5, the size of the side portion 76 is appropriately maintained. In the tire 22, the side portion 76 effectively contributes to reduction of uneven wear. In this viewpoint, the ratio is more preferably less than or equal to 0.45.

In the tire 22, a ratio of the width W of the side portion 76 to the height H of the side portion 76 is preferably not less than 0.2. When the ratio is set to be not less than 0.2, the sidewall 28 put in the side portion 76 effectively inhibits the base layer 52 from having the protrusion. In the tire 22, the thickness of the cap layer 54 at the bottom of the sub-groove 72 is appropriately assured. Therefore, damage is less likely to occur at the bottom of the sub-groove 72. In addition, the side portion 76 has an appropriate stiffness. Therefore, in the tire 22, uneven wear is sufficiently prevented. In this viewpoint, the ratio is more preferably not less than 0.25.

In FIG. 2, reference character PK represents an end of a boundary 84 between the sidewall 28 and the cap layer 54. In the tire 22, the end PK of the boundary 84 is disposed on the inner surface of the side portion 76.

In the tire 22, the end PK of the boundary 84 is preferably disposed inward of the outer end PE of the top surface 80 of the side portion 76 in the axial direction. Thus, the volume of the sidewall 28 of the side portion 76 is sufficiently assured, and the base layer 52 is effectively inhibited from having the protrusion. In the tire 22, the thickness of the cap layer 54 at the bottom of the sub-groove 72 is appropriately assured. In the tire 22, damage is less likely to occur at the bottom of the sub-groove 72. In the tire 22, the effect of reducing uneven wear is exhibited by the sub-groove 72 as expected.

In the tire 22, the end PK of the boundary 84 may be disposed inward of the inner end PT of the top surface 80 of the side portion 76 in the radial direction. In this case, the end PK is preferably disposed outward of the position PG of half the height H of the side portion 76, in the radial direction. Thus, a distance from the sub-groove 72 to the sidewall 28 is appropriately maintained, and, further, the thickness of the cap layer 54 at the bottom of the sub-groove 72 is appropriately assured. In the tire 22, damage is less likely to occur at the bottom of the sub-groove 72. In the tire 22, the sub-groove 72 or the side portion 76 effectively contributes to reduction of uneven wear.

In FIG. 2, a double-headed arrow HK represents a distance from the end PK of the boundary 84 to the deepest portion PU of the groove 24. The distance HK is represented as a distance in the depth direction of the sub-groove 72.

In the tire 22, in a case where the end PK of the boundary 84 is disposed on the inner surface of the side portion 76, a ratio of the distance HK to the height H of the side portion 76 is preferably greater than or equal to 0.5. When the ratio is set to be greater than or equal to 0.5, a distance from the sub-groove 72 to the sidewall 28 is appropriately maintained, and, further, the thickness of the cap layer 54 at the bottom of the sub-groove 72 is appropriately assured. In the tire 22, damage is less likely to occur at the bottom of the sub-groove 72. In the tire 22, the sub-groove 72 or the side portion 76 effectively contributes to reduction of uneven wear. From this viewpoint, the ratio is more preferably greater than or equal to 0.6. In the tire 22, the end PK may be disposed in a range from the outer end PE of the top surface 80 of the side portion 76 to the position PG of half the height H of the side portion 76. Therefore, the upper limit of the ratio is not particularly set.

In FIG. 2, a double-headed arrow WS represents the width, of the sidewall 28, measured along the imaginary straight line LH. In the present invention, the width WS is the width of the sidewall 28 in the side portion 76.

In the tire 22, from the viewpoint that a distance from the sub-groove 72 to the sidewall 28 is appropriately maintained, and, further, the thickness of the cap layer 54 at the bottom of the sub-groove 72 is appropriately assured, the position of the end PK of the boundary 84 between the sidewall 28 and the cap layer 54 is preferably equal to the position PG of half the height H of the side portion 76, in the radial direction, or the end PK is preferably disposed outward of the position PG in the radial direction as described above. In other words, a ratio of the width WS of the sidewall 28 to the width W of the side portion 76 is preferably less than or equal to 1. The ratio is more preferably less than or equal to 0.9. From the viewpoint that the volume of the sidewall 28 in the side portion 76 is sufficiently assured, and the base layer 52 is effectively inhibited from having the protrusion, the ratio is preferably not less than 0.1 and more preferably not less than 0.2.

EXAMPLES

Example 1

A tire having the basic structure shown in FIGS. 1 to 2 and the specifications indicated below in Table 1 was produced (In the table, "Example 1" is abbreviated as "Ex. 1"). The size of the tire was 295/75R22.5. In shoulder ribs of the tire, each side portion was formed by a cap layer and a sidewall, and the sidewall was stacked on the cap layer. A ratio (W/H) of the width W of the side portion to the height H of the side portion was 0.25. The ratio (HK/H) of the height HK from the bottom of a sub-groove to the end of the boundary between the sidewall and the cap layer relative to the height H of the side portion was 0.60. In Example 1, a component was not added and the groove was not formed into a special shape in order to prevent the sub-groove from being damaged. This is indicated in Table 1 as "-" in the cells for "shape" and "material".

Comparative Example 1

Comparative example 1 is a conventional tire. The structure of shoulder ribs in comparative example 1 was as shown in FIG. 3. The distance HS from the end PE of the top surface of the side portion to the end PK of the boundary was 5 mm. In Table 1, "Comparative example 1" is abbreviated as "Comp. Ex. 1".

Comparative Example 2

A tire of comparative example 2 was obtained in the same manner as in comparative example 1 except that a sub-groove was formed into a special shape which was a round-bottom-flask shape. In Table 1, "Y" in the cell for "shape" indicates that the sub-groove was formed into the special shape.

Examples 2 to 11

Tires of examples 2 to 11 were each obtained in the same manner as in example 1 except that the ratio (W/H) and the ratio (HK/H) were as indicated below in Tables 1 to 3.

Example 12

A tire of example 12 was obtained in the same manner as in example 1 except that the end of the boundary between a sidewall and a cap layer was disposed between the inner side end PT and the outer side end PE of the top surface of a side portion.

[Evaluation for Performance]

Each tire was mounted on a normal rim, and inflated with air to an internal pressure of 830 kPa. The tires were scratch-mounted to front wheels and rear wheels of a truck (10 tons), and the truck was caused to run on a general public road (expressway and general road) in a fully loaded state at a speed of 80 km/h. When the truck had run fifty thousand miles, the tires were collected, and occurrence of the uneven wear in the tires was confirmed, and the tires were each disassembled, and occurrence of disarrangement and damage in the base layers at the sub-groove portions was confirmed. The results are indicated below in Tables 1 to 3 as indexes based on the grading below. The greater the numerical value is, the better the evaluation is.

disarrangement
2=no protrusion of the base layer was confirmed
1=a small protrusion of the base layer at such a level that did not cause a problem was confirmed
0=protrusion of the base layer was confirmed durability
2=no damage (crack) was confirmed at the bottom of the sub-groove
1=a small damage at such a level which did not cause a problem was confirmed at the bottom of the sub-groove
0=damage was confirmed at the bottom of the sub-groove uneven wear
2=an amount of wear in the shoulder rib was less than 0.01 mm
1=an amount of wear in the shoulder rib was greater than or equal to 0.01 mm and less than 0.02 mm
0=an amount of wear in the shoulder rib was greater than or equal to 0.02 mm

[Cost]

Production cost of each tire was calculated, and the degree to which the cost was increased was confirmed. The results are indicated below in Tables 1 to 3 as indexes based on the grading below. The greater the numerical value is, the better the inhibition of increase of cost is and the better the evaluation is.

2=cost was not increased.
1=cost was slightly increased to such a level that did not cause a problem.
0=cost was increased.

[Overall Evaluation]

A total value of the evaluation results was calculated. The result is indicated in the cell for "overall". The greater the numerical value is, the better the evaluation is.

TABLE 1

| | Evaluation result | | | | | | | | |
|---|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 | Comp. Ex. 3 |
| Structure | FIG. 2 | FIG. 2 | FIG. 2 | FIG. 2 | FIG. 2 | FIG. 2 | FIG. 3 | FIG. 3 | FIG. 3 |
| W/H [—] | 0.25 | 0.45 | 0.10 | 0.15 | 0.60 | 0.80 | 0.30 | 0.30 | 0.40 |
| HK/H [—] | 0.60 | 1.00 | 0.20 | 0.70 | 0.60 | 0.35 | — | — | — |
| Shape | — | — | — | — | — | — | — | Y | — |
| Material | — | — | — | — | — | — | — | — | Y |
| Disarrangement | 2 | 2 | 2 | 2 | 2 | 2 | 0 | 0 | 0 |
| Durability | 2 | 2 | 0 | 2 | 2 | 1 | 0 | 1 | 2 |
| Cost | 2 | 2 | 2 | 2 | 2 | 2 | 2 | 0 | 0 |
| Uneven wear | 2 | 2 | 0 | 0 | 0 | 0 | 0 | 1 | 2 |
| Overall | 8 | 8 | 4 | 6 | 6 | 5 | 2 | 2 | 4 |

TABLE 2

| | Evaluation result | | |
|---|---|---|---|
| | Ex. 7 | Ex. 8 | Ex. 9 |
| Structure | FIG. 2 | FIG. 2 | FIG. 2 |
| W/H [—] | 0.10 | 0.25 | 0.25 |
| HK/H [—] | 0.60 | 0.40 | 0.70 |
| Shape | — | — | — |
| Material | — | — | — |
| Disarrangement | 2 | 2 | 2 |
| Durability | 1 | 1 | 2 |
| Cost | 2 | 2 | 2 |
| Uneven wear | 0 | 0 | 2 |
| Overall | 5 | 5 | 8 |

TABLE 3

| | Evaluation result | | |
|---|---|---|---|
| | Ex. 10 | Ex. 11 | Ex. 12 |
| Structure | FIG. 2 | FIG. 2 | FIG. 2 |
| W/H [—] | 0.45 | 0.60 | 0.45 |
| HK/H [—] | 0.70 | 1.00 | — |
| Shape | — | — | — |
| Material | — | — | — |
| Disarrangement | 2 | 2 | 2 |
| Durability | 2 | 2 | 2 |
| Cost | 2 | 2 | 2 |
| Uneven wear | 2 | 0 | 2 |
| Overall | 8 | 6 | 8 |

As indicated in Tables 1 to 3, evaluation for the tires of examples is higher than the evaluation for the tires of comparative examples. This evaluation result clearly indicates that the present invention is superior.

The technique for the shoulder ribs as described above is applicable also to various tires.

The foregoing description is in all aspects illustrative, and various modifications can be devised without departing from the essential features of the invention.

What is claimed is:

1. A pneumatic tire comprising a plurality of ribs aligned in an axial direction, the pneumatic tire being formed such that a rib, among the plurality of ribs, disposed on an outer side in the axial direction is sectioned into a body portion and a side portion by a groove that extends in a circumferential direction, the pneumatic tire comprising:
   a tread; and
   a pair of sidewalls, wherein
   the sidewalls extend inwardly from ends of the tread respectively in a radial direction,
   the tread includes a base layer, and a cap layer disposed outward of the base layer in the radial direction, and
   the side portion is formed by the cap layer and a corresponding one of the sidewalls, and
   the sidewall is stacked on the cap layer in the side portion, wherein
   the side portion has a top surface on an outer side in the radial direction, and the entire top surface is composed of the outer surface of the sidewall, and
   the entire outer surface of the body portion is formed by the cap layer.

2. The pneumatic tire according to claim 1, wherein in the side portion, an end of a boundary between the sidewall and the cap layer is disposed inward of an outer end of the top surface in the axial direction.

3. The pneumatic tire according to claim 2, wherein the end of the boundary between the sidewall and the cap layer is disposed outward of a position corresponding to half a height of the side portion in the radial direction.

4. The pneumatic tire according to claim 1, wherein a ratio of a width of the side portion to a height of the side portion is less than or equal to 0.5.

5. The pneumatic tire according to claim 4, wherein the ratio of the width of the side portion to the height of the side portion is not less than 0.2.

6. The pneumatic tire according to claim 5, wherein
in the side portion, an end of a boundary between the sidewall and the cap layer is disposed inward of an outer end of the top surface in the axial direction.

7. The pneumatic tire according to claim 6, wherein the end of the boundary between the sidewall and the cap layer is disposed outward of a position corresponding to half the height of the side portion in the radial direction.

8. The pneumatic tire according to claim 4, wherein
in the side portion, an end of a boundary between the sidewall and the cap layer is disposed inward of an outer end of the top surface in the axial direction.

9. The pneumatic tire according to claim 8, wherein the end of the boundary between the sidewall and the cap layer is disposed outward of a position corresponding to half the height of the side portion in the radial direction.

\* \* \* \* \*